(12) United States Patent
Hampson et al.

(10) Patent No.: US 11,945,979 B2
(45) Date of Patent: Apr. 2, 2024

(54) COMPOSITE PRODUCTS

(71) Applicant: KNAUF INSULATION SPRL, Vise (BE)

(72) Inventors: Carl Hampson, Liverpool (GB); Oliver Callaghan, Manchester (GB)

(73) Assignees: Knauf Insulation, Inc., Shelbyville, IN (US); Knauf Insulation SPRL, Vise (BE)

( * ) Notice: Subject to any disclaimer, the term of this patent is extended or adjusted under 35 U.S.C. 154(b) by 420 days.

(21) Appl. No.: 17/042,096

(22) PCT Filed: Mar. 27, 2019

(86) PCT No.: PCT/EP2019/057802
§ 371 (c)(1),
(2) Date: Sep. 26, 2020

(87) PCT Pub. No.: WO2019/185761
PCT Pub. Date: Oct. 3, 2019

(65) Prior Publication Data
US 2021/0102104 A1 Apr. 8, 2021

(30) Foreign Application Priority Data

Mar. 27, 2018 (GB) .................................... 1804907

(51) Int. Cl.
*C09J 105/00* (2006.01)
*B27N 3/00* (2006.01)
(Continued)

(52) U.S. Cl.
CPC ............ *C09J 179/02* (2013.01); *B27N 3/002* (2013.01); *B29C 70/08* (2013.01); *C09J 105/00* (2013.01);
(Continued)

(58) Field of Classification Search
CPC ..... B27N 3/002; B29C 67/248; B29C 67/249; B29C 70/06; B29C 70/08; C03C 13/06;
(Continued)

(56) References Cited

U.S. PATENT DOCUMENTS 1,801,052 A 4/1931 Meigs
1,801,053 A 4/1931 Meigs
(Continued)

FOREIGN PATENT DOCUMENTS

AU 8538765 8/1985
AU 9640921 7/1997
(Continued)

OTHER PUBLICATIONS

International Search Report and Written Opinion for PCT/EP2019/057802 (12 pages), completed May 7, 2019.
(Continued)

*Primary Examiner* — Michael A Tolin
(74) *Attorney, Agent, or Firm* — Knauf Insulation, Inc.; James K. Blodgett

(57) ABSTRACT

A method of manufacturing a composite product, comprising: —applying a binder composition, notably in the form of an aqueous solution, to non or loosely assembled matter to provide resinated matter, wherein the binder composition consists of a binder composition prepared by combining reactants comprising at least 50% by dry weight reducing sugar reactant(s) and at least 5% by dry weight nitrogen-containing reactant(s); and—arranging the resinated matter to provide loosely arranged resinated matter; and—subjecting the loosely arranged resinated matter to heat and/or pressure to cure the binder composition and to form the composite product; —wherein the nitrogen-containing reactant(s) comprise TPTA triprimary triamine(s), notably
(Continued)

wherein the nitrogen-containing reactant(s) comprise at least 5% by dry weight of TPTA triprimary triamine(s).

15 Claims, 2 Drawing Sheets

(51) Int. Cl.
  *B29C 70/08* (2006.01)
  *C09J 161/34* (2006.01)
  *C09J 179/02* (2006.01)
  *D04H 1/587* (2012.01)
  *D04H 3/12* (2006.01)

(52) U.S. Cl.
  CPC ............ *C09J 161/34* (2013.01); *D04H 1/587* (2013.01); *D04H 3/12* (2013.01)

(58) Field of Classification Search
  CPC ....... C03C 25/26; C09J 105/00; C09J 161/34; C09J 179/02; D04H 1/4209; D04H 1/4218; D04H 1/58; D04H 1/587; D04H 1/645; D04H 3/002; D04H 3/004; D04H 3/12
  See application file for complete search history.

(56) References Cited

U.S. PATENT DOCUMENTS

| | | |
|---|---|---|
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,784,408 A | 1/1974 | Jaffe et al. |
| 3,791,807 A | 2/1974 | Etzel et al. |
| 3,802,897 A | 4/1974 | Voigt |
| 3,809,664 A | 5/1974 | Burr |
| 3,826,767 A | 7/1974 | Hoover et al. |
| 3,856,606 A | 12/1974 | Fan |
| 3,867,119 A | 2/1975 | Takeo et al. |
| 3,907,724 A | 9/1975 | Higginbottom |
| 3,911,048 A | 10/1975 | Vargiu et al. |
| 3,919,134 A | 11/1975 | Higginbottom |
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,244,474 A | 9/1993 | Lorcks et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |

(56) References Cited

U.S. PATENT DOCUMENTS

| | | |
|---|---|---|
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Andersen et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |

(56) References Cited

U.S. PATENT DOCUMENTS

| | | |
|---|---|---|
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Hamed |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Wagner et al. |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0117023 A1 | 5/2010 | Dopico |

(56) References Cited

U.S. PATENT DOCUMENTS

| | | | |
|---|---|---|---|
| 2010/0129640 A1 | 5/2010 | Kelly | |
| 2010/0130649 A1 | 5/2010 | Swift | |
| 2010/0175826 A1 | 7/2010 | Huenig | |
| 2010/0210595 A1 | 8/2010 | Wagner et al. | |
| 2010/0222463 A1 | 9/2010 | Brady et al. | |
| 2010/0222566 A1 | 9/2010 | Fosdick et al. | |
| 2010/0282996 A1 | 11/2010 | Jaffrennou et al. | |
| 2010/0301256 A1 | 12/2010 | Hampson et al. | |
| 2010/0320113 A1 | 12/2010 | Swift | |
| 2011/0021672 A1 | 1/2011 | Crews et al. | |
| 2011/0039111 A1 | 2/2011 | Shooshtari | |
| 2011/0040010 A1 | 2/2011 | Shooshtari | |
| 2011/0042303 A1 | 2/2011 | Shooshtari et al. | |
| 2011/0045966 A1 | 2/2011 | Shooshtari et al. | |
| 2011/0089074 A1 | 4/2011 | Jackson et al. | |
| 2011/0135937 A1 | 6/2011 | Swift et al. | |
| 2011/0190425 A1 | 8/2011 | Swift | |
| 2011/0220835 A1 | 9/2011 | Swift et al. | |
| 2011/0256790 A1 | 10/2011 | Toas et al. | |
| 2011/0260094 A1 | 10/2011 | Hampson et al. | |
| 2011/0262648 A1 | 10/2011 | Lee et al. | |
| 2011/0263757 A1 | 10/2011 | Rand et al. | |
| 2011/0306726 A1 | 12/2011 | Bailey et al. | |
| 2012/0133073 A1 | 5/2012 | Pacorel et al. | |
| 2012/0156954 A1 | 6/2012 | Eckert et al. | |
| 2013/0029150 A1 | 1/2013 | Appley et al. | |
| 2013/0032749 A1 | 2/2013 | Jaffrennou et al. | |
| 2013/0047888 A1 | 2/2013 | Mueller et al. | |
| 2013/0059075 A1 | 3/2013 | Appley et al. | |
| 2013/0082205 A1 | 4/2013 | Mueller et al. | |
| 2013/0127085 A1 | 5/2013 | Kalbe et al. | |
| 2013/0174758 A1 | 7/2013 | Mueller | |
| 2013/0234362 A1 | 9/2013 | Swift et al. | |
| 2013/0236650 A1 | 9/2013 | Swift et al. | |
| 2013/0237113 A1 | 9/2013 | Swift et al. | |
| 2013/0244524 A1 | 9/2013 | Swift et al. | |
| 2014/0091247 A1 | 4/2014 | Jackson et al. | |
| 2014/0134909 A1 | 5/2014 | Guo et al. | |
| 2014/0186635 A1* | 7/2014 | Mueller | C08G 14/00 264/137 |
| 2014/0357787 A1 | 12/2014 | Jobber et al. | |
| 2015/0299391 A1* | 10/2015 | Pacorel | C08G 73/02 528/405 |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0375235 A1 | 6/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |

(56) References Cited

FOREIGN PATENT DOCUMENTS

| WO | 2010139899 | 12/2010 |
|---|---|---|
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011/138458 | 11/2011 |
| WO | 2011138459 | 11/2011 |
| WO | 2013150123 | 10/2013 |
| WO | 2014/086775 | 6/2014 |
| WO | 2017/0207355 | 12/2017 |

OTHER PUBLICATIONS

International Search Report and Written Opinion for PCT/US2008/059730, completed Sep. 22, 2008.
International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update," Chemistry & Industry, No. 17, 1988, 4 pages.
"Gamma-aminopropyltrimethoxysilane," Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.

(56) References Cited

OTHER PUBLICATIONS

Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/390,445 (14 pages)—dated Dec. 3, 2015.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/116,254 (12 pages)—dated Nov. 3, 2021.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (7 pages)—dated May 24, 2019.
Office action for co-pending U.S. Appl. No. 15/690,623 (6 pages)—dated Jan. 9, 2020.
Office action for co-pending U.S. Appl. No. 16/357,320 (7 pages)—dated Jun. 10, 2021.
Office action for co-pending U.S. Appl. No. 16/357,320 (9 pages)—dated Dec. 29, 2021.
Office action for co-pending U.S. Appl. No. 16/357,320 (9 pages)—dated Apr. 14, 2022.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D631,670 (68 pages, filed Jun. 19, 2015 by Petitioners Johns Manville Corporation and Johns Manville, Inc.).
2nd Petition for Inter Partes Review of U.S. Pat. No. D631,670 (62 pages, filed Nov. 2, 2015 by Petitioners Johns Manville Corporation and Johns Manville, Inc.).
Decision of PTAB regarding Institution of Inter Partes Review for U.S. Pat. No. D631,670 (33 pages)—Jan. 12, 2016.
Decision2 of PTAB regarding Institution of Inter Partes Review for U.S. Pat. No. D631,670 (27 pages)—May 9, 2016.

(56) References Cited

OTHER PUBLICATIONS

Final Written Decision of PTAB regarding Inter Partes Review of U.S. Pat. No. D631,670 based on 1st Petition (56 pages)—Jan. 11, 2017.
Final Written Decision of PTAB regarding Inter Partes Review of U.S. Pat. No. D631,670 based on 2nd Petition (55 pages)—May 8, 2017.
Court of Appeals for Federal Circuit Judgment from Appeal of PTAB Decisions in Inter Partes Reviews of U.S. Pat. No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed July 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed July 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with 1st Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with 2nd Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with 3rd Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, mailed Dec. 24, 2013, in Control U.S. Appl. No. 90/013,029, 11 pages.
Office Action Granting Ex Parte Reexamination of U.S. Pat. No. 7,772,347, mailed Dec. 24, 2013, in Control U.S. Appl. No. 90/013,030, 14 pages.
Office Action Granting Ex Parte Reexamination of U.S. Pat. No. 7,854,980, mailed Apr. 15, 2014, in Control U.S. Appl. No. 90/013,156, 20 pages.
Declaration of Jan Rud Andersen submitted in Ex parte Reexamination Control U.S. Appl. No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—Apr. 3, 2019.
Final Office Action from Reopened Prosecution in Ex Parte Reexamination of U.S. Pat. No. 7,854,980 (11 pages)—Aug. 8, 2019.
Notice of Intent to Issue Ex Parte Reexamination Certificate for U.S. Pat. No. 7,854,980 (3 pages)—dated Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.

(56) References Cited

OTHER PUBLICATIONS

Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Decision of USPTO Granting Ex Parte Re-exam of U.S. Pat. No. 9,464,207 (19 pages)—Aug. 27, 2021.
Office Action in Ex Parte Reexamination of U.S. Pat. No. 9,464,207 (14 pages)—Sep. 9, 2022.
Notice of Intent to Issue Ex Parte Re-examination Certificate re U.S. Pat. No. 9,464,207 (9 pages)—Jun. 8, 2023.
Decision of USPTO Granting Ex Parte Re-exam of U.S. Pat. No. 9,926,464 (16 pages)—Sep. 7, 2021.
Office Action in Ex Parte Reexamination of U.S. Pat. No. 9,926,464 (15 pages)—Mar. 21, 2023.
Notice of Intent to Issue Ex Parte Re-examination Certificate re U.S. Pat. No. 9,926,464 (6 pages)—Jul. 25, 2023.
Decision of USPTO Granting Ex Parte Re-exam of U.S. Pat. No. 9,469,747 (10 pages)—Sep. 16, 2021.
Office Action in Ex Parte Reexamination of U.S. Pat. No. 9,469,747 (9 pages)—Feb. 28, 2023.
Notice of Intent to Issue Ex Parte Re-examination Certificate re U.S. Pat. No. 9,469,747 (6 pages)—Jul. 25, 2023.
Decision of USPTO Granting Ex Parte Re-exam of U.S. Pat. No. 8,114,210 (13 pages)—Dec. 1, 2021.
Office Action in Ex Parte Reexamination of U.S. Pat. No. 8,114,210 (11 pages)—Mar. 27, 2023.
Notice of Intent to Issue Ex Parte Re-examination Certificate re U.S. Pat. No. 8,114,210 (6 pages)—Aug. 8, 2023.
Decision of USPTO Granting Ex Parte Re-exam of U.S. Pat. No. 8,940,089 (13 pages)—Jan. 28, 2022.
Office Action in Ex Parte Reexamination of U.S. Pat. No. 8,940,089 (11 pages)—Jul. 17, 2023.
Decision of USPTO Granting Ex Parte Re-exam of U.S. Pat. No. 9,828,287 (11 pages)—Feb. 1, 2022.
Office Action in Ex Parte Reexamination of U.S. Pat. No. 9,828,287 (9 pages) - Feb. 28, 2023.
Notice of Intent to Issue Ex Parte Re-examination Certificate re U.S. Pat. No. 9,828,287 (6 pages)—Jul. 25, 2023.
Decision of USPTO Granting Ex Parte Re-exam of U.S. Pat. No. 9,039,827 (13 pages)—Feb. 1, 2022.
Office Action in Ex Parte Reexamination of U.S. Pat. No. 9,039,827 (11 pages)—Aug. 16, 2023.
Notice of Intent to Issue Ex Parte Reexamination Certificate for U.S. Pat. No. 8,114,210 (4 pages)—May 27, 2021.
Notice of Intent to Issue Ex Parte Reexamination Certificate for U.S. Pat. No. 9,464,207 (4 pages)—Apr. 19, 2021.
Notice of Intent to Issue Ex Parte Reexamination Certificate for U.S. Pat. No. 9,828,287 (5 pages)—May 5, 2021.
Notice of Intent to Issue Ex Parte Reexamination Certificate for U.S. Pat. No. 9,926,464 (5 pages)—May 5, 2021.
Notice of Intent to Issue Ex Parte Reexamination Certificate for U.S. Pat. No. 9,469,747 (8 pages)—May 21, 2021.
Notice of Intent to Issue Ex Parte Reexamination Certificate for U.S. Pat. No. 9,039,827 (3 pages)—Jul. 2, 2021.
Notice of Intent to Issue Ex Parte Reexamination Certificate for U.S. Pat. No. 8,940,089 (4 pages)—Jul. 13, 2021.
Petition for Post Grant Review of U.S. Pat. No. 10,968,629 (50 pages, filed Jan. 6, 2022 by Petitioner Rockwool International A/S).
Denial of Petition for Post Grant Review of U.S. Pat. No. 10,968,629 entered by Patent Trial and Appeal Board (19 pages)—Jul. 6, 2022.
Statement of Revocation Grounds re GB2496951-Claimant Rockwool International (May 21, 2018, 22 pages).
Statement of Revocation Grounds re GB2451719-Claimant Rockwool International (May 18, 2018, 22 pages).
Expert Report re Revocation of GB2451719 and GB2496951-Claimant Rockwool International (Nov. 12, 2018, 11 pages).

(56) References Cited

OTHER PUBLICATIONS

United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
File Wrapper re U.S. Pat. No. 2,965,504—Part 1 (10 pages).
File Wrapper re U.S. Pat. No. 2,965,504—Part 2 (14 pages).
File Wrapper re U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
BASF Observations re EP20190713473 (= European National Filing of PCT/EP2019/057801), 5 pages, submitted to EPO on Dec. 22, 2022.

\* cited by examiner

COMPOSITE PRODUCTS

CROSS-REFERENCE TO RELATED APPLICATIONS

This application is a U.S. national counterpart application of International Application Ser. No. PCT/EP2019/057802, filed Mar. 27, 2019, under 35 U.S.C. § 371, which claims priority to GB Application Ser. No. 1804907.2, filed Mar. 27, 2018, the disclosures of which are hereby incorporated herein by reference.

FIELD OF THE INVENTION AND SUMMARY

The present invention relates to composite products and a method for their production. The present invention provides binder compositions with properties including excellent curing rates, bond strength, parting strength, tensile strength and low swelling properties, ease of handling and good storage stability.

DETAILED DESCRIPTION

Figure 1:
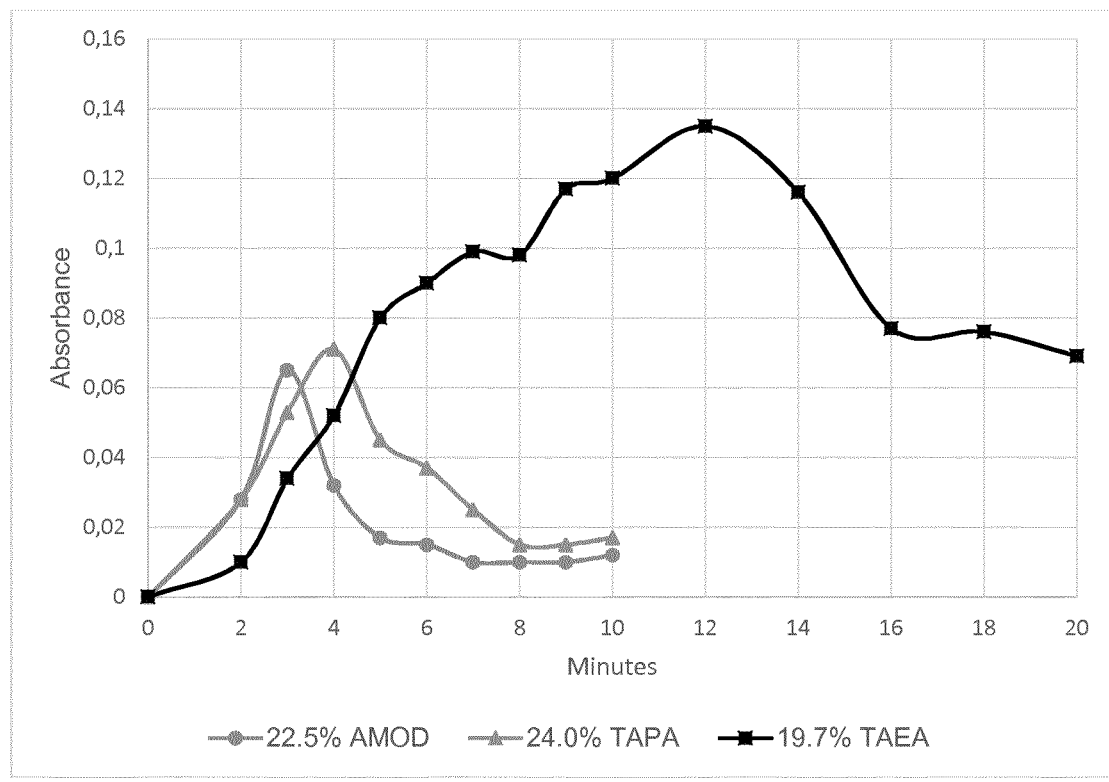
FIG. 1 shows cure results of a laboratory cure test of triprimary polyamines

In accordance with one aspect, the present invention provides a method of manufacturing a composite product, comprising:
  applying a binder composition, notably in the form of an aqueous solution, to non or loosely assembled matter to provide resinated matter, wherein the binder composition consists of a binder composition prepared by combining reactants comprising at least 50% by dry weight reducing sugar reactant(s) and at least 5% by dry weight nitrogen-containing reactant(s); and
  arranging the resinated matter to provide loosely arranged resinated matter; and
  subjecting the loosely arranged resinated matter to heat and/or pressure to cure the binder composition and to form the composite product;
  wherein the nitrogen-containing reactant(s) comprise TPTA triprimary triamine(s), notably wherein the nitrogen-containing reactant(s) comprise at least 5% by dry weight of TPTA triprimary triamine(s).

As used herein, the term "TPTA triprimary triamine(s)" means triprimary triamine(s) selected from:
  triprimary triamine(s) having spacer groups between each of the three primary amines which consist of carbon chains;
  triprimary triamine(s) having spacer groups between each of the three primary amines wherein each spacer group has a spacer length which is less than or equal to 12 polyvalent atoms; and
  triprimary triamine(s) having a total number of polyvalent atoms which is less than or equal to 23.

In one preferred embodiment the TPTA triprimary triamine(s) comprise, and more preferably consist of, triprimary triamine(s) having spacer groups between each of the three primary amines which consist of carbon chains. In another preferred embodiment the TPTA triprimary triamine(s) comprise, and more preferably consist of, triprimary triamine(s) having spacer groups between each of the three primary amines wherein each spacer group has a spacer length which is less than or equal to 12 polyvalent atoms. In a further preferred embodiment the TPTA triprimary triamine(s) comprise, and more preferably consist of, triprimary triamine(s) having a total number of polyvalent atoms which is less than or equal to 23.

In accordance with another aspect, the present invention provides a composite product, manufactured by a method comprising:
  applying a binder composition, notably in the form of an aqueous solution, to non or loosely assembled matter to provide resinated matter, wherein the binder composition consists of a binder composition prepared by combining reactants comprising at least 50% by dry weight reducing sugar reactant(s) and at least 5% by dry weight nitrogen-containing reactant(s); and
  arranging the resinated matter to provide loosely arranged resinated matter; and
  subjecting the loosely arranged resinated matter to heat and/or pressure to cure the binder composition and to form the composite product;
  wherein the nitrogen-containing reactant(s) comprise TPTA triprimary triamine(s), notably wherein the nitrogen-containing reactant(s) comprise at least 5% by dry weight of TPTA triprimary triamine(s).

According to a further aspect, the present invention provides a method of manufacturing a composite product comprising;
  applying a binder composition, notably in the form of an aqueous solution, to non or loosely assembled matter to provide resinated matter, wherein the binder composition consists of a binder composition prepared by combining reactants consisting of between 60% and 95% by dry weight reducing sugar reactant(s) and between 5% and 40% by dry weight nitrogen-containing reactant(s); and
  arranging the resinated matter to provide loosely arranged resinated matter; and
  subjecting the loosely arranged resinated matter to heat and/or pressure to cure the binder composition and to form the composite product;
  wherein the nitrogen-containing reactant(s) comprise at least 95 wt % of triprimary triamine(s) having spacer groups between each of the three primary amines which consist of carbon chains.

The non or loosely assembled matter may comprise woven or non-woven fiber material. The non or loosely assembled matter may be selected from fibers, notably selected from inorganic fibers, man-made organic fibers, mineral fibers, stone fibers, glass fibers, aramid fibers, ceramic fibers, metal fibers, carbon fibers, polyimide fibers, polyester fibers, rayon fibers, cellulosic fibers and combinations thereof. The non or loosely assembled matter may be selected from particulates, notably selected from inorganic particles, sand and coal, natural fibers, jute, flax, hemp, straw and combinations thereof.

The composite product may be mineral fiber insulation product, for example glass wool, a glass fiber mat, stone wool or stone fiber mat. The composite products may be mineral fiber veil, e.g. a glass fiber veil, which may then find application for example in battery separators, as substrate for roofing products such as roofing membranes or shingles, or other membranes. The composite product may be prepregs, high pressure laminates, refractory bricks, foundry sands, brake pads, corrugated cardboard.

The composite product may be a high pressure laminate. According to this aspect the present invention provides a method of manufacturing a high pressure laminate comprising:

provinding a binder impregnated core layer by impregnating cellulosic fibrous sheets, notably kraft paper sheets with a binder composition providing a semi-finished assembly by assembling the binder impregnated core layer with a surface layer; and applying heat and/or pressure to the semi-finished assembly to cure the binder composition in the binder impregnated core layer and secure the core layer and the surface layer together to form the high pressure laminate;

wherein the binder composition consists of a binder composition prepared by combining reactants comprising at least 50% by dry weight reducing sugar reactant(s) and at least 5% by dry weight nitrogen-containing reactant(s); and wherein the nitrogen-containing reactant(s) comprise TPTA triprimary triamine(s), notably wherein the nitrogen-containing reactant(s) comprise at least 5% by dry weight of TPTA triprimary triamine(s).

The composite product may be a corrugated cardboard. According to this aspect the present invention provides a method of manufacturing a corrugated cardboard comprising:

applying a binder composition between the fluted corrugated sheet and the one or two flat linerboards; and applying heat and/or pressure to cure the binder composition to form the corrugated cardboard;

wherein the binder composition consists of a binder composition prepared by combining reactants comprising at least 50% by dry weight reducing sugar reactant(s) and at least 5% by dry weight nitrogen-containing reactant(s); and wherein the nitrogen-containing reactant(s) comprise TPTA triprimary triamine(s), notably wherein the nitrogen-containing reactant(s) comprise at least 5% by dry weight of TPTA triprimary triamine(s).

According to a further aspect, the present invention provides a method of manufacturing a composite mineral fiber product selected from a non-woven veil, glass wool insulation and stone wool insulation comprising;

applying a binder composition in the form of an aqueous solution to non or loosely assembled mineral fibers to provide resinated mineral fibers, wherein the binder composition consists of a binder composition prepared by combining reactants consisting of between 60% and 95% by dry weight reducing sugar reactant(s) and between 5% and 40% by dry weight nitrogen-containing reactant(s); and arranging the resinated mineral fibers to provide loosely arranged resinated mineral fibers; and subjecting the loosely arranged resinated mineral fibers to heat to cure the binder composition and to form the composite mineral fiber product;

wherein the nitrogen-containing reactant(s) comprise at least 95 wt % of triprimary triamine(s) having spacer groups between each of the three primary amines which consist of carbon chains.

According to a further aspect the present invention provides a method of manufacturing a composite product as defined in claim 1. The dependent claims define preferred or alternative embodiments.

Any feature described herein in relation to a particular aspect of the invention may be used in relation to any other aspect of the invention.

The term "binder composition" as used herein means all ingredients applied to the non or loosely assembled matter and/or present on the non or loosely assembled matter, notably prior to curing, (other than the non or loosely assembled matter itself and any moisture in the non or loosely assembled matter), including reactants, solvents (including water) and additives. The term "dry weight of the binder composition" as used herein means the weight of all components of the binder composition other than any water that is present (whether in the form of liquid water or in the form of water of crystallization). The reactants may make up ≥80%, ≥90% or ≥95% and/or ≥99% or ≥98% by dry weight of the binder composition.

The binder composition applied to the non or loosely assembled matter comprises reactants which cross-link when cured to form a cured binder which holds the non or loosely assembled matter together to form the composite product. The binder composition comprises reactants that will preferably form a thermoset resin upon curing.

The binder composition is preferably free of, or comprises no more than 2 wt %, no more than 5 wt % or no more than 10 wt % of urea formaldehyde (UF), melamine urea formaldehyde (MUF) and/or phenol formaldehyde.

The binder composition is preferably a "no added formaldehyde binder" that is to say that none of ingredients used to form the binder composition comprise formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

The term "loosely arranged resinated matter" as used herein means that the resinated matter is assembled together with sufficient integrity for the resinated matter to be processed along a production line but without the resinated matter being permanently joined together in a way that is achieved by fully cross-linking the binder composition. Prior to curing, the binder composition preferably provides a stickiness or tackiness which holds the loosely arranged resinated matter together.

Preferably, the binder composition is a reducing sugar based binder composition, that is to say that at least 50 wt % of the reactants comprise reducing sugar(s) and/or reaction products of reducing sugar(s). The binder composition may be prepared by combining reactants comprising, consisting essentially of or consisting of the reducing sugar reactant(s) and the nitrogen-containing reactant(s). In the form in which it is applied to the non or loosely assembled matter the binder composition may comprise (a) the reducing sugar reactant(s) and the nitrogen-containing reactant(s) and/or (b) curable reaction product(s) of the reducing sugar reactant(s) and the nitrogen-containing reactant(s).

As used herein, the term "consist or consisting essentially of" is intended to limit the scope of a statement or claim to the specified materials or steps and those that do not materially affect the basic and novel characteristic(s) of the invention.

The reducing sugar reactant(s) may comprise: a monosaccharide, a monosaccharide in its aldose or ketose form, a disaccharide, a polysaccharide, a triose, a tetrose, a pentose, xylose, a hexose, dextrose, fructose, a heptose, or mixtures thereof. The reducing sugar reactant(s) may be yielded in situ by carbohydrate reactant(s), notably carbohydrate reactant(s) having a dextrose equivalent of at least about 50, at least about 60, at least about 70, at least about 80 or at least about 90, notably carbohydrate reactant(s) selected from the group consisting of molasses, starch, starch hydrolysate, cellulose hydrolysates, and mixtures thereof. The reducing sugar reactant(s) may comprise or consist of a combination of dextrose and fructose, for example in which the combination of dextrose and fructose makes up at least 80 wt % of the reducing sugar reactant(s) and/or in which the dextrose makes up at least 40 wt % of the reducing sugar reactant(s) and/or in which the fructose makes up at least 40 wt % of the reducing sugar reactant(s); the reducing sugar reactant(s) may comprise or consist of high fructose corn syrup (HFCS). The reducing sugar reactant(s) may comprise or consist of reducing sugar reactant(s) yielded in situ by sucrose. The reducing sugar reactant(s) may comprise reducing sugar reactant(s) selected from the group consisting of xylose, arabinose dextrose, mannose, fructose and combinations thereof, for example making up at least 80 wt % of the reducing sugar reactant(s).

As used herein, the term "nitrogen-containing reactant(s)" means one or more chemical compound which contain(s) at least one nitrogen atom and which is/are capable of reacting with the reducing sugar reactant(s); preferably the nitrogen-containing reactant(s) consist of Maillard reactant(s), that is to say reactant(s) which is/are capable of reacting with the reducing sugar reactant(s) as part of a Maillard reaction.

The nitrogen-containing reactant(s) comprise, and may consist essentially of or consist of, triprimary triamine(s) having spacer groups between each of the three primary amines which consist of carbon chains. The triprimary triamine(s) may be selected from the group consisting of triaminodecanes, triaminononanes, notably 4-(aminomethyl)-1,8-octanediamine, triaminooctanes, triaminoheptanes, notably 1,4,7-triaminoheptane, triaminohexanes, notably 1,3,6-triaminohexane, triaminopentanes, and including isomers and combination thereof.

As used herein the term "triprimary triamine(s)" means organic compound having three and only three amines, each of the three amines being primary amines (—$NH_2$). One, two or each of the primary amine(s) of the triprimary triamine(s) may be present in the form of a salt, e.g as an ammonium group (—$NH_3^+$).

As used herein, the term "spacer group" in the terminology "the spacer group(s) separating each of the three primary amines" means a chain separating two primary amines. As used herein, the term "the spacer group(s) separating each primary amines in the molecule consists of carbon chains" means that the spacer group(s) consist only of carbon atoms bonded to hydrogen atoms or bonded to other carbon atoms. The triprimary triamine(s) having spacer groups between each of the three primary amines which consist of carbon chains thus consist of the three primary amines and carbon and hydrogen atoms. For example, when the spacer group(s) separating each primary amine in the molecule consists of carbon chains, no heteroatoms are present in the spacer groups.

The spacer group(s) may be selected from the group consisting of alkanediyls, heteroalkanediyls, alkenediyls, heteroalkenediyls, alkynediyls, heteroalkynediyls, linear alkanediyls, linear heteroalkanediyls, linear alkenediyls, linear heteroalkenediyls, linear alkynediyls, linear heteroalkynediyls, cycloalkanediyls, cycloheteroalkanediyls, cycloalkenediyls, cycloheteroalkenediyls, cycloalkynediyls and cycloheteroalkynediyls, each of which may be branched or unbranched. The spacer group(s) may be selected from the group consisting of alkanediyls, alkenediyls, alkynediyls, linear alkanediyls, linear alkenediyls, linear alkynediyls, cycloalkanediyls, cycloalkenediyls and cycloalkynediyls, each of which may be branched or unbranched. The spacer group may comprise or may be devoid of halogen atoms. The spacer groups may comprise or be devoid of aromatic groups. As used herein: the term "alkanediyl" means a saturated chain of carbon atoms ie without carbon-carbon double or triple bonds; the term "alkenediyl" means a chain of carbon atoms that comprises at least one carbon-carbon double bond; the term "alkynediyl" means a chain of carbon atoms that comprises at least one carbon-carbon triple bond; the term "cyclo" in relation to cycloalkanediyl, cycloalkenediyl and cycloalkynediyl indicates that at least a portion of the chain is cyclic and also includes polycyclic structures; and the term "linear" in relation to alkanediyls, alkenediyls and alkynediyls indicates an absence of a cyclic portion in the chain. As used herein, the term "hetero" in relation to heteroalkanediyls, heteroalkenediyls, heteroalkynediyls, linear heteroalkanediyls, linear heteroalkenediyls, linear heteroalkynediyls, cycloheteroalkanediyls, cycloheteroalkenediyls, and cycloheteroalkynediyls means that the chain comprises at least one polyvalent heteroatom. As used herein, the term heteroatom is any atom that is not carbon or hydrogen. As used herein, the term polyvalent atom means an atom that is able to be covalently bonded to at least 2 other atoms. The polyvalent heteroatom may be oxygen; it may be silicon; it may be sulfur or phosphorus. One, two or preferably each of the spacer groups may have a total number of polyvalent atoms, or a total number of carbon atoms which is ≥3, ≥4 or ≥5 and/or ≥12, ≥10 or ≥9. One, two or preferably each of the spacer groups may have a spacer length which is ≥3, ≥4 or ≥5 and/or ≥12, ≥10 or ≥9. As used herein, the term "spacer length" in relation to a spacer group separating two primary amines means the number of polyvalent atoms which form the shortest chain of covalently bonded atoms between the two primary amines. Each of the spacer groups between the three primary amines of the TPTA triprimary triamine(s) may: consist of an alkanediyl; and/or be linear; and/or be unbranched; and/or have a number of carbon atoms which is ≥3 or ≥4 and/or ≥9 or ≥3; and or have a spacer length which is ≥3 or ≥4 and/or ≥9 or ≥8. The total number of the polyvalent atoms of the TPTA triprimary triamine(s) may be ≥9, ≥11 or ≥12 and/or ≥23, ≥21, ≥19 or ≥17.

The nitrogen-containing reactant(s) may comprise reactant(s) selected from the group consisting of: inorganic amines, organic amines, organic amines comprising at least one primary amine, salts of an organic amine comprising at least one primary amine, polyamines, polyprimary polyamines and combinations thereof, any of which may be substituted or unsubstituted. The nitrogen-containing reactant(s) may comprise $NH_3$, $NH_3$ may be used as such (e.g. in form of an aqueous solution), or as an inorganic or organic ammonium salt, for example ammonium sulfate, ammonium phosphate, e.g. diammonium phosphate or ammonium citrate, e.g. triammonium citrate, or as a source of $NH_3$, e.g. urea. In one preferred embodiment, the nitrogen-containing reactant(s) comprise ammonium sulfate. In another preferred embodiment, the nitrogen-containing reactant(s) comprise ammonium citrate. As used herein, the term "polyamine" means any organic compound having two or more amine groups and the term "polyprimary polyamine" means an organic compound having two or more primary amines (—$NH_2$). As used herein the term "substituted" means the replacement of one or more hydrogen atoms with other functional groups. Such other functional groups may include hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The polyprimary polyamine may be a diamine, triamine, tetramine, or pentamine. As used herein the term "diamine" means organic compound having two (and only two) amines, "triamine" means organic compound having three (and only three) amines, "tetramine" means organic compound having four (and only four) amines and "pentamine" means organic compound having five (and only five) amines. For example, the polyprimary amine may be: a triamine selected from diethylenetriamine (which is a diprimary triamine, i.e. diethylenetriamine has three amines, two of them being primary amines) or bis(hexamethylene)triamine; a tetramine, notably triethylenetetramine; or a pentamine, notably tetraethylenepentamine. The polyprimary polyamine may comprise diprimary diamine, notably 1,6-diaminohexane (hexamethylenediamine, HMDA) or 1,5-diamino-2-methylpentane (2-methyl-pentamethylenediamine).

The binder composition may comprise, consist essentially of or consist of a binder composition prepared by combining reactants wherein:
the reducing sugar reactant(s) make up:
≥50%, ≥60%, ≥70% by dry weight of the reactant(s), and/or
≥97%, ≥95%, ≥90%, ≥85% by dry weight of the reactant(s), and/or the nitrogen-containing reactant(s) make up:
≥3%, ≥5%, ≥7%, ≥10%, ≥15% by dry weight of the reactant(s), and/or
≥50%, ≥40%, ≥30%, ≥25% by dry weight of the reactant(s).

The binder composition may comprise, consist essentially of or consist of a binder composition prepared by combining reactants consisting of between 60% and 95% by dry weight reducing sugar reactant(s) and between 5% and 40% by dry weight nitrogen-containing reactant(s).

The TPTA triprimary triamine(s) may make up:
≥3%, ≥5%, ≥7%, ≥10%, ≥15%, and/or
≥40%, ≥35%, ≥30%, ≥25%
by dry weight of the reactants of the binder composition.

The TPTA triprimary triamine(s) may make up:
≥5%, ≥10%, ≥15%, ≥20%, ≥30%, ≥40%, ≥50%, ≥60%, 65%; and/or
≥95%, ≥90%, ≥85%, ≥80%, ≥70%, ≥60%, ≥50%, ≥45%, ≥30%
by dry weight of the nitrogen-containing reactants.

The TPTA triprimary triamine(s) may make up: ≥90% and ≥99%; or ≥80% and ≥90%; or ≥60% and ≥80%; by dry weight of the nitrogen-containing reactants. Particularly in the aforementioned cases, the remaining nitrogen-containing reactants may comprise amines and/or nitriles.

When the nitrogen-containing reactant(s) comprise nitrogen-containing reactant(s) other than TPTA triprimary triamine(s), the and notably each nitrogen-containing reactant other than TPTA triprimary triamine(s), may make up:
≥3%, ≥5%, ≥7%, ≥10%, ≥15%, and/or
≥40%, ≥35%, ≥30%, ≥25%
by dry weight of the reactants of the binder composition.

The and notably each nitrogen-containing reactant other than TPTA triprimary triamine(s), may make up:
≥5%, ≥10%, ≥15%, ≥20%, ≥30%, ≥40%, ≥50%, ≥60%, ≥65%; and/or
≥95%, ≥90%, ≥85%, ≥80%, ≥70%, ≥60%, ≥50%, ≥45%, ≥30%
by dry weight of the nitrogen-containing reactants.

The ratio of carbonyl groups in the reducing sugar reactant(s) to reactive amino groups in the nitrogen-containing reactant(s) may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2. As used herein, the term "reactive amino group" means any amino group in the nitrogen-containing reactant(s) which is capable of reacting with the reducing sugar reactant(s). Specifically, examples of such reactive amino groups comprise primary and secondary amine(s).

The nitrogen-containing reactant(s) and the reducing sugar reactant(s) preferably are Maillard reactants. The nitrogen-containing reactant(s) and the reducing sugar reactant(s) (or their reaction product(s)) preferably react to form Maillard reaction products, notably melanoidins when cured. Curing of the binder composition may comprise or consist essentially of Maillard reaction(s). Preferably, the cured binder consists essentially of Maillard reaction products. The cured binder composition may comprise melanoidin-containing and/or nitrogenous-containing polymer(s); it is preferably a thermoset binder and is preferably substantially water insoluble.

The binder composition and/or the cured binder may comprise ester and/or polyester compounds.

The binder composition may be prepared by combining all the reducing sugar reactant(s) and all the nitrogen-containing reactant(s) in a single preparation step, for example by dissolving the reducing sugar reactant(s) in water and then adding the nitrogen-containing reactant(s). The term "single preparation step" is used herein to differentiate from a "multiple preparation step" preparation in which a first portion of reactants are combined and stored and/or allowed to react for a pre-determined time before addition of further reactants.

Alternatively, the binder composition may be prepared by:
combining reducing sugar reactant(s), notably all of the reducing sugar reactant(s), with a first portion of the nitrogen-containing reactant(s) to provide an intermediate binder composition,
storing the intermediate binder composition; and
combining the intermediate binder composition with a second portion of the nitrogen-containing reactant(s) to provide the binder composition.

The intermediate binder composition may comprise, consist essentially of or consist of reaction products of the reducing sugar reactant(s), with a first portion of the nitrogen-containing reactant(s). The reactants may be heated to provide the intermediate binder composition; the intermediate binder composition may be subsequently cooled.

The first and second portions of nitrogen-containing reactant(s) may be the same nitrogen-containing reactant(s) or, alternatively they may be different nitrogen-containing reactant(s).

Only one of the first and second portion of nitrogen-containing reactant(s), or alternatively each of the first and second portion of nitrogen-containing reactant(s), may comprise, consist essentially of or consist of TPTA triprimary triamine(s).

As used herein "storing the intermediate binder composition" means that the intermediate binder composition is stored or shipped for a prolonged time, notably without crystallization of the reducing sugar reactant(s) or gelling which would render the binder composition unusable. The intermediate binder composition may be stored for a period of at least 30 min, at least 1 h, at least 4 h, at least 12 h, at least 24 h, at least 96 h, at least 1 week, at least 2 weeks, or at least 4 weeks.

The binder composition may comprise one or more additive, for example one or more additives selected from dedusting oil, waxes, dyes, release agents, formaldehyde scavengers (for example urea, tannins, quebracho extract, ammonium phosphate, bisulfite), water repellent agent, silanes, silicones, lignins, lignosulphonates and non-carbohydrate polyhydroxy component selected from glycerol, polyethylene glycol, polypropylene glycol, trimethylolpropane, pentaerythritol, polyvinyl alcohol, partially hydrolyzed polyvinyl acetate, fully hydrolyzed polyvinyl acetate, or mixtures thereof. Such additives are generally not reactants of the binder composition, that is to say they so do not cross-link with the reducing sugar and/or the nitrogen containing reactant(s) (or reaction products thereof) as part of the curing of the binder composition.

The binder composition may be applied to the non or loosely assembled matter in the form of a liquid, notably in the form of an aqueous composition, for example comprising an aqueous solution or dispersion, notably in which the dry weight of the aqueous binder composition makes up: $\geq 5$ wt %, $\geq 10$ wt %, $\geq 15$ wt %, $\geq 20$ wt % or $\geq 25$ wt and/or $\geq 95$ wt %, $\geq 90$ wt %, $\geq 85$ wt % or $\geq 80$ wt % of the total weight of the aqueous binder composition. Alternatively, the binder composition may be applied to the non or loosely assembled matter in the form of a solid, for example as a powder or as particles. The binder composition may be applied by being sprayed. The binder composition may be applied to the non or loosely assembled matter by passing the non or loosely assembled matter through a spray of the binder composition or by spraying the binder composition over the non or loosely assembled matter. The binder composition may be applied by being spread, for example as a continuous layer or as a discontinuous layer, for example as lines of binder. Other application techniques include roll application, dip coating and dry mixing.

In one aspect, the binder composition may be used to make mineral fiber insulation products. The method of producing a mineral fiber insulation product may comprise the sequential steps of:
  forming a mineral melt from a molten mineral mixture
  forming mineral fibers from the mineral melt
  spraying the binder composition, notably as an aqueous composition, on to the mineral fibers, notably spraying the binder composition on to airborne mineral fibers subsequent to formation of the fibers and prior to collection of the fibers to form a blanket of mineral fibers;
  collecting the mineral fibers to which the binder composition has been applied to form a blanket of mineral fibers; and
  curing the binder composition by passing the blanket of mineral fibers through a curing oven.

Prior to curing, the mineral fibers to which the binder composition has been applied may be collected to form a primary blanket of mineral fibers which is subsequently folded over itself, for example using a pendulum mechanism, to produce a secondary blanket comprising superimposed layers of the primary blanket.

The dry weight of the aqueous binder composition, notably when applied to the mineral fibers, may make up: $\geq 5$ wt %, $\geq 7.5$ wt %, $\geq 10$ wt %, $\geq 12$ wt % and/or $\geq 20$ wt %, $\geq 18$ wt %, $\geq 15$ wt % of the total weight of the aqueous binder composition.

The curing oven may have a plurality of heating zones having temperatures within the range 200° C. to 350° C. (typically 230° C. to 300° C.). A thin, low density product (12 kg/m³ or less) may be cured by passing through the curing oven in as little as 20 seconds; a thick, high density product (80 kg/m³ or more) may require a passage of 15 minutes or more in the curing oven. The blanket of mineral fibers may reach a temperature in the range 180° C.-220° C. during the curing process. The duration of passage of the blanket through the curing oven may be $\geq 0.5$ minutes, $\geq 1$ minute, $\geq 2$ minutes, $\geq 5$ minutes or $\geq 10$ minutes and/or $\geq 50$ minutes, $\geq 40$ minutes or $\geq 30$ minutes.

The quantity of cured binder in the cured blanket of mineral fibers may be $\geq 1\%$, $\geq 2\%$, $\geq 2.5\%$, $\geq 3\%$, $\geq 3.5\%$ or $\geq 4\%$ and/or $\geq 10\%$ or $\geq 8\%$. This may be measured by loss on ignition (LOI).

When the composite product is a mineral fiber insulation product, the product may have one or more of the following characteristics:
  a density greater than 5, 8 or 10 kg/m³;
  a density less than 200, 180 or 150 km/m³
  comprise glass fibers and have a density greater than 5, 8 or 10 kg/m³ and/or less than 80, 60 or 50 kg/m³;
  comprise stone fibers and have a density greater than 15, 20 or 25 kg/m³ and/or less than 220, 200 or 180 kg/m³;
  a thermal conductivity λ of less than 0.05 W/mK and/or greater than 0.02 W/mK measured at 10° C. notably in accordance with EN12667;
  comprise less than 99% by weight and/or more than 80% by weight mineral fibers;
  a thickness of greater than 10 mm, 15 mm or 20 mm and/or less than 400 mm, 350 mm or 300 mm.

The mineral fiber insulation product, notably when it is a low or medium density mineral fiber insulation product, may have
  a nominal thickness in the range 60-260 mm; and/or
  a thermal resistance R of R$\geq 3$ m²K/W, preferably R$\geq 4$ m²K/W at a thickness or 200 mm; and/or
  a density in the range 5-40 kg/m³, particularly 5-18 kg/m³ or 7-12 kg/m³.

The mineral fiber insulation product, notably when it is a high density mineral fiber insulation product, may have
  a nominal thickness in the range 20 to 200 mm; and/or
  a thermal resistance R of R$\geq 1.7$ m²K/W, preferably R$\geq 2$ m²K/W at a thickness or 100 mm; and/or
  a density in the range 100 to 200 kg/m³, particularly 130 to 190 kg/m³.

Use of a binder composition as described herein and wherein the TPTA triprimary triamine(s) makes up $\geq 10\%$, $\geq 15\%$, $\geq 20\%$ and/or $\geq 25\%$, $\geq 30\%$, $\geq 35\%$ by dry weight of the nitrogen-containing reactants may be particularly advantageous for mineral fiber insulation product, notably high density mineral fiber insulation products.

According to one aspect, the binder composition may be used to make a mineral fiber veil. The mineral fiber veil may be manufactured by a wet laid process or a dry laid process. The method of producing the mineral fiber veil may comprise the sequential steps of:
  forming a mineral fiber web, notably the mineral fiber web may be formed by i) pouring a dispersion of fibers in water, notably chopped mineral fibers, on to a perforated conveyor belt (often referred to as a wire) through which the water is drained to form a non-woven web of fibers or ii) projecting fibers in an airstream towards of perforated conveyor to form a web of non-woven fibers applying the binder composition, notably as an aqueous composition, on to the mineral fibers, notably by coating the aqueous binder composition on to the mineral fiber web; and curing the binder composition by passing the resinated mineral fiber web through a curing oven.

When the composite product is a mineral fiber veil, the quantity of cured binder in the final product may be ≥1%, ≥2.5%, ≥5%, ≥7.5%≥10%, or ≥12.5% and/or ≥25%, ≥22.5%, ≥20% or ≥17.5%. This may be measured by loss on ignition (LOI).

The thickness of the mineral fiber veil may be ≥0.1 mm or ≥0.3 mm and/or ≥0.8 mm or ≥0.6 mm. When the mineral fiber veil is a glass veil, the thickness may be ≥0.3 mm and ≥0.6 mm. The mineral fiber veil may have a surface weight ≥20 g/m² or ≥30 g/m² or ≥40 g/m² or ≥50 g/m² and/or ≥60 g/m² or ≥80 g/m² or ≥100 g/m² or ≥150 g/m² or ≥350 g/m².

Use of a binder composition as described herein and wherein the TPTA triprimary triamine(s) makes up ≥15%, ≥20% and/or ≥40%, ≥50% by dry weight of the nitrogen-containing reactants may be particularly advantageous for mineral fiber veils.

Methods of manufacturing composite products according to the present invention allow for cure speeds which are at least equivalent to and indeed faster than those obtained with comparable binder systems; similarly, the dry tensile strength of the cured composite products is at least equivalent to and indeed in some cases improved when compared to that obtained with comparable binder systems. Surprisingly, the wet strength of composite products manufactured according to the present invention is significantly improved with respect to that obtained with comparable binder systems. The wet strength provides an indication of the performance after aging and/or after weathering. This is unexpected as it is generally expected that the wet strength of a composite product will be lower than but proportional to its dry strength. Without wishing to be being bound by theory, it is believed that the improved properties of the binder compositions of the present invention are due to the use of TPTA triprimary triamine(s) and particularly due to the spacer groups being carbon chains with an absence of heteroatoms within the spacer groups and/or due to the spatial geometry of the TPTA triprimary triamine(s) molecules.

Embodiment of the invention will now be described, by way of example only, with reference to the accompanying figures of which:

FIG. 1 shows cure results of a laboratory cure test of triprimary polyamines

Figure 2:
FIG. 2 shows 4-(aminomethyl)-1,8-octanediamine ("AMOD")

FIG. 2 shows 4-(aminomethyl)-1,8-octanediamine ("AMOD"); and

Figure 3:
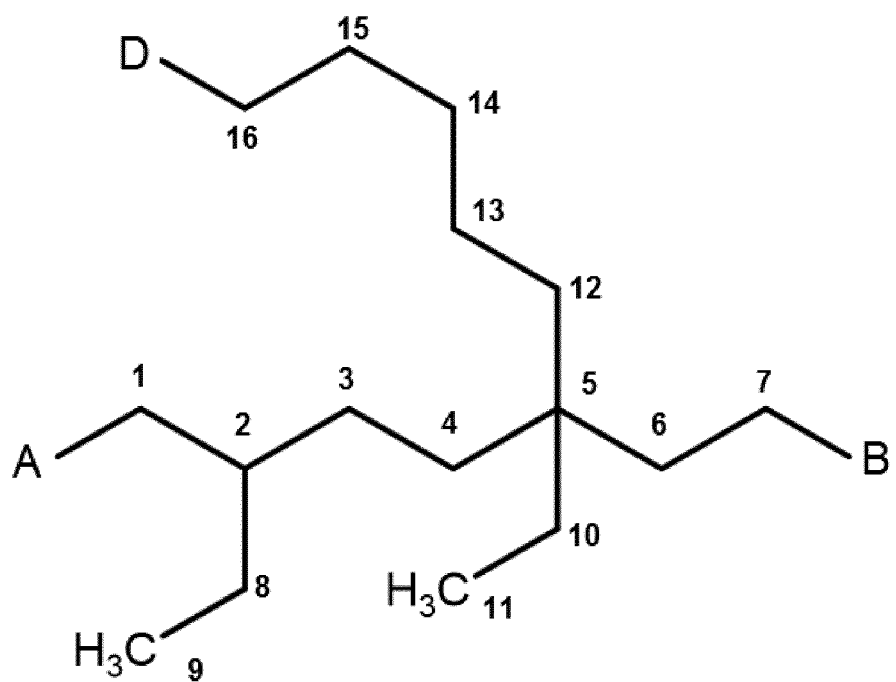
FIG. 3 shows an example of a TPTA triprimary triamine.

FIG. 3 shows an example of a TPTA triprimary triamine.

Examples made on mineral fiber veil are representative of improved properties obtained with TPTA triprimary amine(s) for composite products, notably glass wool insulation and stone wool insulation products.

Example 1

Laboratory Indication of Cure Speed with HFCS

The following binder compositions were prepared by combining a nitrogen containing reactant and a reducing sugar reactant:

| Binder composition | nitrogen containing reactant | % dry weight | Notes |
|---|---|---|---|
| 1a | AMOD (4-(aminomethyl)-1,8-octanediamine | 22.5% | a TPTA triprimary triamine |
| 1b | TAPA (tris(3-aminopropyl)amine) | 24.0% | a triprimary tetramine |
| 1c | TAEA (tris(2-aminoethyl)amine) | 19.7% | a triprimary tetramine |

The nitrogen containing reactants of binder compositions 1b and 1c are not TPTA triprimary triamines and thus provide comparative examples. Each of the binder compositions was prepared by combining the nitrogen containing reactant with HFCS 42 (high fructose corn syrup with 42% fructose+52% dextrose+trace quantities of other saccharides) in water to obtain a solution/dispersion containing 1 molar equivalent of triprimary polyamine to 3.31 molar equivalents of reducing sugars. The amounts of triprimary polyamines used in the binder compositions are expressed above and in FIG. 1 as dry weight % (the remaining dry weight being the HFCS 42) and the binder compositions were prepared at 22.5% total solids weight. Each binder composition was formulated to give a primary amine to carbonyl molar ratio on 1:1.105. FIG. 1 shows the light absorbance of leachates from glass fiber filters: drops of the binder compositions were applied to the glass fiber filters which were then were placed in an oven at 107° C. and subsequently removed after set time intervals. Brown polymers were formed on the filters, then dissolved in water and the absorbance of the leachate measured using a spectrophotometer. The evolution of the formation of soluble brown polymers and insoluble polymers provides an initial laboratory indication of curing and cure speed for these type of binders.

FIG. 1 shows that binder composition 1a using AMOD (4-(aminomethyl)-1,8-octanediamine, a TPTA triprimary triamine) shows a faster curing rate compared to binder composition 1b using TAPA (tris(3-aminopropyl)amine) and binder composition 1c using TAEA (tris(2-aminoethyl)amine) which are both triprimary tetramines.

Example 2

Examples of binder compositions tested on mineral fiber veils are shown in Table 1 with their respective mean dry veil tensile strengths and mean wet tensile strengths.

In each case, a nitrogen containing reactant comprising a triprimary polyamine was combined with HFCS 42 (high fructose corn syrup with 42% fructose+52% dextrose+trace quantities of other saccharides) in water to obtain a solution/dispersion containing 1 molar equivalent of triprimary polyamine to 3.31 molar equivalent of reducing sugars. The amounts of triprimary polyamines used in the binder compositions are expressed in Table 1 as dry weight %, the remaining dry weight being the HFCS, and the binder compositions were prepared at 2% weight (bake out solids). Once the binder compositions were prepared, they were applied to A4 size glass veil and the glass veils were cured to obtain a quantity of cured binder in the final product of 10% LOI (loss on ignition).

Measurement of Dry Glass Veil Tensile Strength:

8 pieces of cured glass veil with a dimension of 14.8 cm×5.2 cm were cut from the cured A4 size veil and subjected to tensile testing by attaching a 50 Kg load cell using glass veil tensile plates on a testometric machine (TESTOMETRIC M350-10CT). The average of the total force in Newtons of the breaking strength is given in the table below. For the measurement of wet glass veil tensile strength, the veil samples are tested wet after being immersed in water at 80° C. for 10 minutes.

The column of wet strength % gives the % of mean wet tensile strength with respect to the % mean dry tensile strength.

TABLE 1

| Triprimary polyamine (% dry weight) | Mean dry tensile strength (N) | Mean wet tensile strength (N) | wet strength % |
| --- | --- | --- | --- |
| TAEA (19.7%) | 73.5 | 25.3 | 31.7% |
| TAPA (24.0%) | 80.9 | 31.4 | 38.8% |
| AMOD (22.5%) | 75.3 | 41.4 | 55.0% |

The results show that all the triprimary polyamines give good dry tensile strengths with TAPA giving a slightly better dry tensile strength compared to AMOD and TAEA. In regard of the wet tensile strengths, AMOD show better results compared to TAPA and TAEA. It is unexpected that the wet strength for AMOD was 55% of the value of the dry tensile strength while for TAPA it was only of 38.8%.

Example 3

Examples of a binder composition for mineral fiber insulation products A binder composition was prepared by combining reactants consisting of 90 parts by weight dextrose monohydrate and 10 parts by dry weight nitrogen-containing reactant where the nitrogen-containing reactant was 4-(aminomethyl)-1,8-octanediamine. This binder composition was suitable for providing appropriate properties when used as a binder composition for mineral wool insulation.

Example 4

Examples of Binder Composition for Mineral Fiber Veils are Shown in Table 2

TABLE 2

| Test Ref | Binder composition (% dry weight) |
| --- | --- |
| A | 77.5% HFCS + 13.5% AMOD + 9% AS |
| B | 77.5% HFCS + 9% AMOD + 13.5% AS |
| C | 77.5% HFCS + 11.25% AMOD + 11.25% AS |
| D | 77.5% HFCS + 22.5% AMOD |
| E | 77.5% HFCS + 22.5% AS |
| F | 85% HFCS + 10% AMOD + 5% AS with an additional 0.3% silane |

Key: HFCS=high fructose corn syrup; AS=ammonium sulphate; AMOD=4-(aminomethyl)-1,8-octanediamine Binder composition E is a comparative example of binder composition with ammonium sulfate (AS).

Binder composition D showed a higher dry tensile strength than binder composition E. Each of binder compositions A, B and C showed a higher dry tensile strength than binder compositions D.

Binder composition F showed a particularly good wet tensile strength; it is currently believed that the silane additive contributes significantly to this good wet tensile strength.

Example 5

Examples of binder composition tested on mineral fiber veils are shown in Table 3 with the respective mean dry veil tensile strengths:

In each test, the nitrogen-containing reactant(s) were mixed with glucose in water. The amounts of the reactants used in the binder compositions are expressed in Table 3 as dry weight % and the binder compositions were prepared at 2% solids weight (bake out solids). Once the binder compositions were prepared, they were applied to glass veil which were cured to obtain a quantity of cured binder in the cured veil of 10% LOI (loss on ignition). The dry tensile strength is measured in the same way as described in example 2.

TABLE 3

| Test Ref | Binder composition (% dry weight) | Mean dry tensile strength (N) |
| --- | --- | --- |
| G (comparative) | 85% Glu + 15% DAP | 76.5 |
| H (comparative) | 85% Glu + 15% AS | 73.5 |
| I (comparative) | 85% Glu + 15% TriCA | 93.0 |
| J | 85% Glu + 15% AMOD | 81.0 |
| K | 85% Glu + 5% AMOD + 10% DAP | 80.0 |
| L | 85% Glu + 7.5% AMOD + 7.5% DAP | 80.2 |
| M | 85% Glu + 10% AMOD + 5% DAP | 82.4 |
| N | 85% Glu + 5% AMOD + 10% AS | 84.7 |
| O | 85% Glu + 7.5% AMOD + 7.5% AS | 90.0 |
| P | 85% Glu + 10% AMOD + 5% AS | 88.6 |
| Q | 85% Glu + 5% AMOD + 10% TriCa | 88.0 |
| R | 85% Glu + 7.5% AMOD + 7.5% TriCA | 91.4 |
| S | 85% Glu + 10% AMOD + 5% TriCa | 87.9 |

Key: Glu=glucose; AS=ammonium sulphate; DAP=diammonium phosphate; TriCA=triammonium citrate; AMOD=4-(aminomethyl)-1,8-octanediamine Binder compositions G, H and I are comparative examples of binder compositions with respectively only diammonium phosphate (DAP), ammonium sulfate (AS), and triammonium citrate (TriCa) as nitrogen-containing reactant. Binder composition J is a binder composition wherein the nitrogen-containing reactant consists of AMOD.

In examples K, L and M, the nitrogen-containing reactants consist of AMOD and DAP in different proportions. Examples J, K, L and M shows that similar levels of dry tensile strength are achieved for each of these binder compositions.

In examples N, O and P, the nitrogen-containing reactants consist of AMOD and AS in different proportions. The binder compositions N, O and P present higher dry tensile strengths compared to the result obtained with the binder composition J. Binder composition O seems to present an optimum result compared to binder compositions N and P. It is believed that there is a synergistic effect of the presence of AS and AMOD as the nitrogen-containing reactants.

FIG. 3 illustrates a TPTA triprimary triamine having three primary amines A, B, D with spacer groups which consist of carbon chains between each of its three primary amines. Each carbon atom is numbered to facilitate the explanation below.

The spacer group between primary amines A and B:
has a spacer length of 7, ie carbon atoms 1, 2, 3, 4, 5, 6, 7 which together form the shortest chain of covalently bonded polyvalent atoms between primary amines A and B (the carbon atoms of the two branched chains 8, 9 and 10, 11 do not form part of the spacer length;

has 11 polyvalent atoms, ie carbon atoms 1, 2, 3, 4, 5, 6, 7, 8, 9, 10 and 11 (the carbon atoms 12, 13, 14, 15, 16 do not form part of the spacer group between A and B as they form a chain which connects the third primary amine D to the molecule).

The spacer group between primary amines A and D:

has a spacer length of 10, ie carbon atoms 1, 2, 3, 4, 5, 12, 13, 14, 15, 16;

has 14 polyvalent atoms, ie carbon atoms 1, 2, 3, 4, 5, 8, 9, 10, 11, 12, 13, 14, 15, 16.

The spacer group between primary amines B and D:

has a spacer length of 8, ie carbon atoms 7, 6, 5, 12, 13, 14, 15, 16;

has 10 polyvalent atoms, ie carbon atoms 7, 6, 5, 12, 13, 14, 15, 16, 10, 11 (the chain of carbon atoms 4, 3, 2, 1, 8, 9 does not form part of the spacer group between B and D as this form a chain which connects the other primary amine A to the molecule.

The total number of polyvalent atoms in the molecule is 19, i.e. carbon atoms 1 to 16 and the 3 nitrogen atoms of the 3 primary amines A, B and D.

The invention claimed is:

1. A method of manufacturing a composite product, comprising:
    applying an aqueous binder composition to non or loosely assembled matter to provide resinated matter, wherein the aqueous binder composition is prepared by combining reactants comprising at least 50% by dry weight reducing sugar reactant(s) and at least 5% by dry weight nitrogen-containing reactant(s) in an aqueous solution;
    arranging the resinated matter to provide loosely arranged resinated matter; and
    subjecting the loosely arranged resinated matter to heat and/or pressure to cure the aqueous binder composition and to form the composite product;
    wherein the nitrogen-containing reactant(s) comprise at least 5% by dry weight of TPTA triprimary triamine(s), the TPTA triprimary triamine(s) being organic compound(s) having three and only three amines, each of the amines being primary amines or salts thereof, selected from the group consisting of:
    a) triprimary triamine(s) having spacer groups between each of the three primary amines which consist of carbon chains;
    b) triprimary triamine(s) having spacer groups between each of the three primary amines wherein each spacer group has a spacer length which is less than or equal to 12 polyvalent atoms; and
    c) triprimary triamine(s) having a total number of polyvalent atoms which is less than or equal to 23.

2. The method according to claim 1, wherein the reducing sugar reactant(s) comprise reducing sugar reactant(s) selected from the group consisting of xylose, dextrose, fructose and combinations thereof.

3. The method according to claim 1, wherein the TPTA triprimary triamine(s) consist of triprimary triamine(s) having spacer groups between each of the three primary amines which consist of carbon chains.

4. The method according to claim 1, wherein the nitrogen-containing reactant(s) comprise triprimary triamine(s) selected from the group consisting of triaminodecanes, triaminononanes, triaminooctanes, triaminoheptanes, triaminohexanes, triaminopentanes, and combination thereof.

5. The method according to claim 1, wherein the nitrogen-containing reactant(s) comprise 4-(aminomethyl)-1,8-octanediamine.

6. The method according to claim 1, wherein the aqueous binder composition is prepared by combining reactants consisting of between 60% and 95% by dry weight reducing sugar reactant(s) and between 5% and 40% by dry weight nitrogen-containing reactant(s).

7. The method according to claim 1, wherein the nitrogen-containing reactant(s) comprise at least 95 wt % of TPTA triprimary triamine(s).

8. The method according to claim 1, wherein the nitrogen-containing reactants comprise reactant(s) different from the TPTA triprimary triamine(s) selected from the group consisting of 1,6-diaminohexane, 1,5-diamino-2-methylpentane, and combinations thereof.

9. The method according to claim 1, wherein the nitrogen-containing reactants comprise reactant(s) different from the TPTA triprimary triamine(s) selected from the group consisting of ammonium sulfate, ammonium phosphate, ammonium citrate, and combinations thereof.

10. The method according to claim 1, wherein the aqueous binder composition is prepared by combining all the reducing sugar reactant(s) and all the nitrogen-containing reactant(s) in a single preparation step.

11. The method according to claim 1, wherein the aqueous binder composition is prepared by:
    combining all of the reducing sugar reactant(s) with a first portion of the nitrogen-containing reactant(s) to provide an intermediate binder composition comprising reaction products of the reducing sugar reactant(s) and the first portion of the nitrogen-containing reactant(s), storing the intermediate binder composition; and
    combining the intermediate binder composition with a second portion of the nitrogen-containing reactant(s) to provide the aqueous binder composition.

12. The method according to claim 1, wherein the aqueous binder composition comprises curable reaction product(s) of the reducing sugar reactant(s) and the nitrogen-containing reactant(s).

13. The method according to claim 1, wherein the composite product is a composite mineral fiber product selected from the group consisting of a non-woven veil, glass wool insulation and stone wool insulation, and wherein the matter is mineral fibers.

14. The method according to claim 13, wherein the composite mineral fiber product is a mineral fiber insulation product.

15. The method according to claim 13, wherein the composite mineral fiber product is a mineral fiber veil.

* * * * *